US011217100B2

(12) United States Patent
Yoo et al.

(10) Patent No.: US 11,217,100 B2
(45) Date of Patent: Jan. 4, 2022

(54) ELECTRONIC DEVICE AND METHOD FOR ASSISTING IN VEHICLE DRIVING

(71) Applicant: Samsung Electronics Co., Ltd., Suwon-si (KR)

(72) Inventors: Jin-woo Yoo, Seongnam-si (KR); Jung-gap Kuk, Seoul (KR); A-ron Baik, Seongnam-si (KR); Min-sung Jang, Seoul (KR); Jung-un Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 16/483,558

(22) PCT Filed: Feb. 2, 2018

(86) PCT No.: PCT/KR2018/001450
§ 371 (c)(1),
(2) Date: Aug. 5, 2019

(87) PCT Pub. No.: WO2018/147599
PCT Pub. Date: Aug. 16, 2018

(65) Prior Publication Data
US 2020/0027352 A1    Jan. 23, 2020

(30) Foreign Application Priority Data

Feb. 7, 2017    (KR) .................. 10-2017-0016852

(51) Int. Cl.
*G08G 1/16* (2006.01)
*B60W 50/14* (2020.01)
(Continued)

(52) U.S. Cl.
CPC ............. *G08G 1/167* (2013.01); *B60W 50/14* (2013.01); *G02B 27/0101* (2013.01);
(Continued)

(58) Field of Classification Search
CPC ...... G08G 1/167; B60W 50/14; B60W 30/18; B60W 40/02; B60W 40/10; B60W 50/00;
(Continued)

(56) References Cited

U.S. PATENT DOCUMENTS 8,487,761 B2    7/2013 Eitle et al.
8,676,487 B2    3/2014 Sakai et al.
(Continued)

FOREIGN PATENT DOCUMENTS

JP    2003-205764 A    7/2003
JP    2006-171950 A    6/2006
(Continued)

OTHER PUBLICATIONS

International Search Report dated May 17, 2018, issued in an International application No. PCT/KR2018/001450.
(Continued)

*Primary Examiner* — Chan S Park
*Assistant Examiner* — Daniel C Chang
(74) *Attorney, Agent, or Firm* — Jefferson IP Law, LLP

(57) ABSTRACT

Provided are an electronic device and method for assisting with driving of a vehicle, the electronic device including: a sensing unit configured to sense a driving state of at least one external vehicle on an entry scheduled lane that the vehicle is to enter by changing lanes; a processor configured to determine an entry possible region on the entry scheduled lane based on the sensed driving state of the at least one external vehicle and determine an entry condition for entry of the vehicle into the entry possible region; and an outputter configured to output information about the entry possible region and the entry condition.

18 Claims, 14 Drawing Sheets

(51) Int. Cl.
  *G02B 27/01*  (2006.01)
  *G06K 9/00*  (2006.01)
  *G06K 9/32*  (2006.01)
  *G06K 9/62*  (2006.01)
(52) U.S. Cl.
  CPC ....... *G06K 9/00798* (2013.01); *G06K 9/3233* (2013.01); *G06K 9/6267* (2013.01)
(58) Field of Classification Search
  CPC .......... G02B 27/0101; G06K 9/00798; G06K 9/3233; G06K 9/6267; G06K 9/00791
  See application file for complete search history.

(56) References Cited

U.S. PATENT DOCUMENTS

| | | | |
|---|---|---|---|
| 8,751,142 | B2 | 6/2014 | Kim |
| 9,150,199 | B2 | 10/2015 | Schleicher et al. |
| 9,233,688 | B2 | 1/2016 | Clarke et al. |
| 9,809,223 | B2 | 11/2017 | Watanabe |
| 9,864,918 | B2 * | 1/2018 | Micks .................. B60W 40/08 |
| 10,140,527 | B2 | 11/2018 | Han et al. |
| 2011/0313664 | A1 * | 12/2011 | Sakai .................. G08G 1/0137 |
| | | | 701/117 |
| 2012/0078500 | A1 | 3/2012 | Yamada et al. |
| 2014/0297172 | A1 | 10/2014 | Huelsen |
| 2016/0016560 | A1 | 1/2016 | Parker et al. |
| 2016/0028824 | A1 | 1/2016 | Stenneth et al. |
| 2016/0035222 | A1 * | 2/2016 | Mikuni ................ G08G 1/0137 |
| | | | 701/117 |
| 2016/0107642 | A1 | 4/2016 | Salgado et al. |
| 2016/0107644 | A1 | 4/2016 | Eigel |
| 2016/0304097 | A1 | 10/2016 | Taira et al. |
| 2017/0008531 | A1 * | 1/2017 | Watanabe ....... B60W 30/18163 |
| 2018/0178716 | A1 * | 6/2018 | Fujii ..................... B60W 10/20 |
| 2020/0027352 | A1 | 1/2020 | Yoo et al. |

FOREIGN PATENT DOCUMENTS

| | | | |
|---|---|---|---|
| JP | 4853525 B2 | | 1/2012 |
| JP | 2015075889 A | * | 4/2015 |
| JP | 2015-174494 A | | 10/2015 |
| JP | 2016189097 A | * | 11/2016 |
| JP | 2017-019358 A | | 1/2017 |
| KR | 10-2012-0018614 A | | 3/2012 |
| KR | 10-2014-0074158 A | | 6/2014 |
| KR | 10-2015-0095102 A | | 8/2015 |
| KR | 10-1558786 B1 | | 10/2015 |
| KR | 10-2018-0091533 A | | 8/2018 |
| WO | WO-2016143113 A1 | * | 9/2016 ......... G01C 21/3667 |

OTHER PUBLICATIONS

Extended European Search Report dated Nov. 28, 2019, issued in a counterpart European application No. 18750769.4-1207/3546310.
Korean Office Action dated Apr. 15, 2021, issued in Korean Patent Application No. 10-2017-0016852.
Korean Notice Of Allowance dated Oct. 12, 2021, issued in Korean Patent Application No. 10-2017-0016852.

* cited by examiner

ELECTRONIC DEVICE AND METHOD FOR ASSISTING IN VEHICLE DRIVING

TECHNICAL FIELD

The present disclosure relates to a device and a method for assisting with driving of a vehicle such that a driver of the vehicle may change lanes safely and conveniently.

BACKGROUND ART

Generally, when a vehicle travels on the road, a driver of the vehicle changes a lane along which the vehicle travels. When changing lanes, the driver checks the left or right side of the vehicle using a mirror provided in the vehicle. Also, when it is determined that there is sufficient space for the vehicle to enter and there is no risk of collision with another vehicle, the driver changes lanes.

However, even though the driver looks at the left or right side of the vehicle through the mirror to change lanes during driving, it is not easy to identify information about a distance between an external vehicle located on the left or right side of the vehicle and the vehicle and a speed of the external vehicle. Therefore, when the driver changes lanes, there is a high possibility that a minor accident between the vehicle and the external vehicle occurs.

DESCRIPTION OF EMBODIMENTS

Technical Problem

Provided are a device and a method for assisting with driving of a vehicle such that a driver of the vehicle may change lanes safely and conveniently when the vehicle changes the lane. Provided is a computer-readable recording medium having recorded thereon a program for executing the method in a computer. Additional aspects will be set forth in part in the description which follows and, in part, will be apparent from the description, or may be learned by practice of the presented embodiments.

BEST MODE

Figure 1:
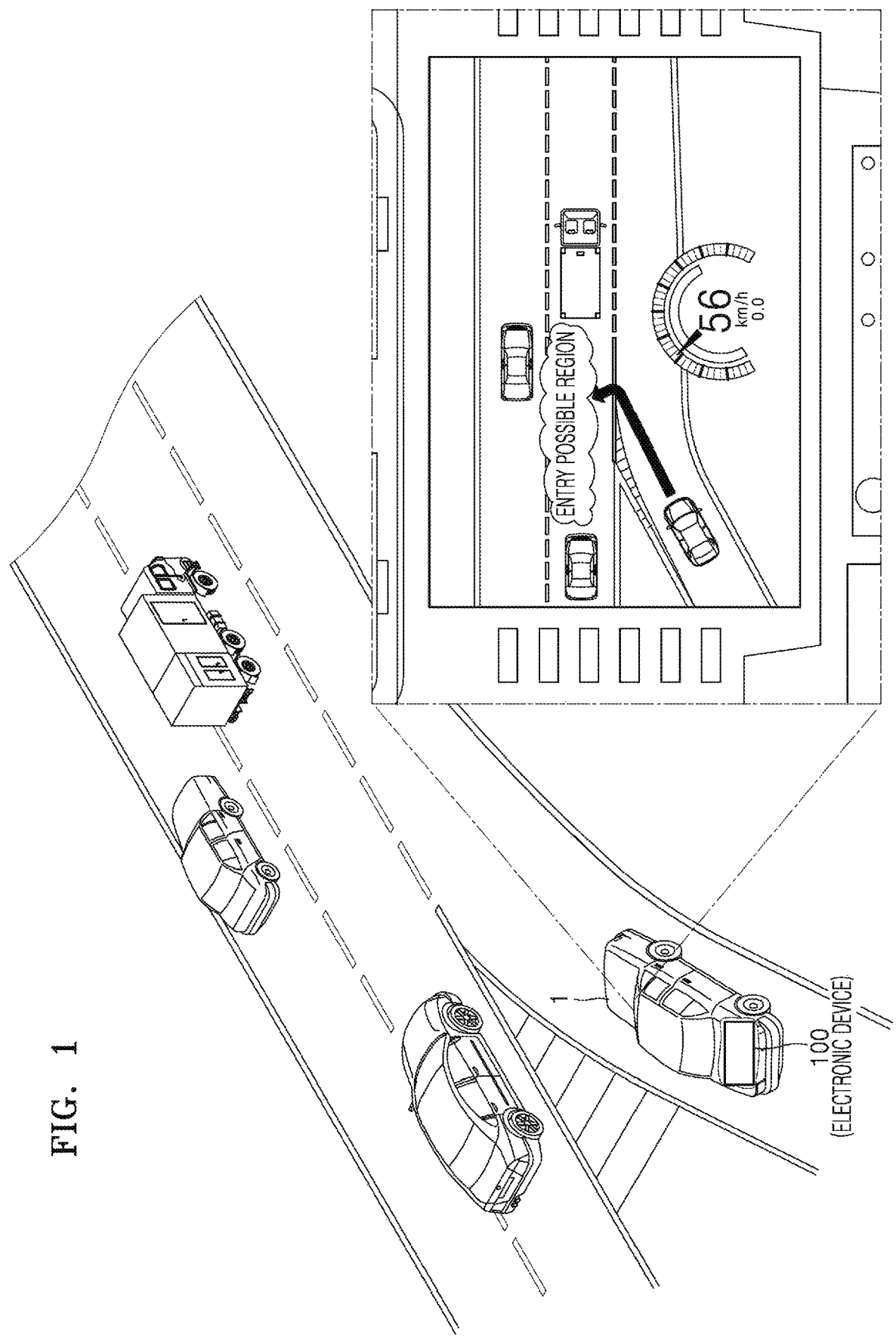
FIG. 1 is a diagram showing an example in which an electronic device for assisting a driver of a vehicle operates, according to an embodiment.

In accordance with an aspect of the disclosure, an electronic device for assisting with driving of a vehicle, the electronic device includes: a sensing unit configured to sense a driving state of at least one external vehicle on an entry scheduled lane that the vehicle is to enter by changing lanes; a processor configured to determine an entry possible region on the entry scheduled lane based on the sensed driving state of the at least one external vehicle and determine an entry condition for entry of the vehicle into the entry possible region; and an outputter configured to output information about the entry possible region and the entry condition.

In accordance with another aspect of the disclosure, a method of assisting a driver of a vehicle, the method includes: sensing a driving state of at least one external vehicle on an entry scheduled lane that the vehicle is to enter by changing lanes; determining an entry possible region on the entry scheduled lane based on the sensed driving state of the at least one external vehicle; determining an entry condition for entry of the vehicle into the entry possible region; and outputting information about the entry possible region and the entry condition.

In accordance with another aspect of the disclosure, a computer-readable recording medium having recorded thereon a program for executing the method in a computer is provided.

Mode of Disclosure

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used. In this case, the meanings of these terms may be described in corresponding parts of the embodiments. Therefore, it is noted that the terms used herein is construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. The term "part" or "module" means a unit used to process at least one function and may be implemented as hardware, software, or a combination of hardware and software.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

The embodiments of the present disclosure will be described in detail with reference to the accompanying drawings below.

FIG. 1 is a diagram showing an example in which an electronic device for assisting a driver of a vehicle operates according to an embodiment.

A vehicle 1 may include an electronic device 100 that assists driving of the vehicle 1 (hereinafter referred to as the electronic device 100). The electronic device 100 is a device for assisting driving of the vehicle 1 such that the driver may drive the vehicle 1 more conveniently and safely. Specifically, when the driver drives the vehicle 1 to change from a current driving lane to a lane to be entered, the electronic device 100 may assist the driver in changing the lane more conveniently.

According to an embodiment, as shown in FIG. 1, when the vehicle 1 enters a highway through an entry ramp, the driver needs to drive the vehicle 1 to change the lane from the current driving lane to an entry scheduled lane on the highway. In this case, the electronic device 100 may sense a driving state of at least one external vehicle on the entry scheduled lane, determine an entry possible region on the entry scheduled lane, and determine an entry condition for the vehicle 1 to enter the determined entry possible region. Accordingly, the electronic device 100 may output information about the determined entry possible region and entry condition. For example, as shown in FIG. 1, the electronic device 100 may display information about a speed at which the vehicle 1 enters the entry possible region on a center information display.

Therefore, the driver may drive the vehicle 1 according to the entry condition and change the lane to the entry possible region, and thus the electronic device 100 may assist driving of the vehicle 1 such that the driver may change the lane more conveniently.

Figure 2:
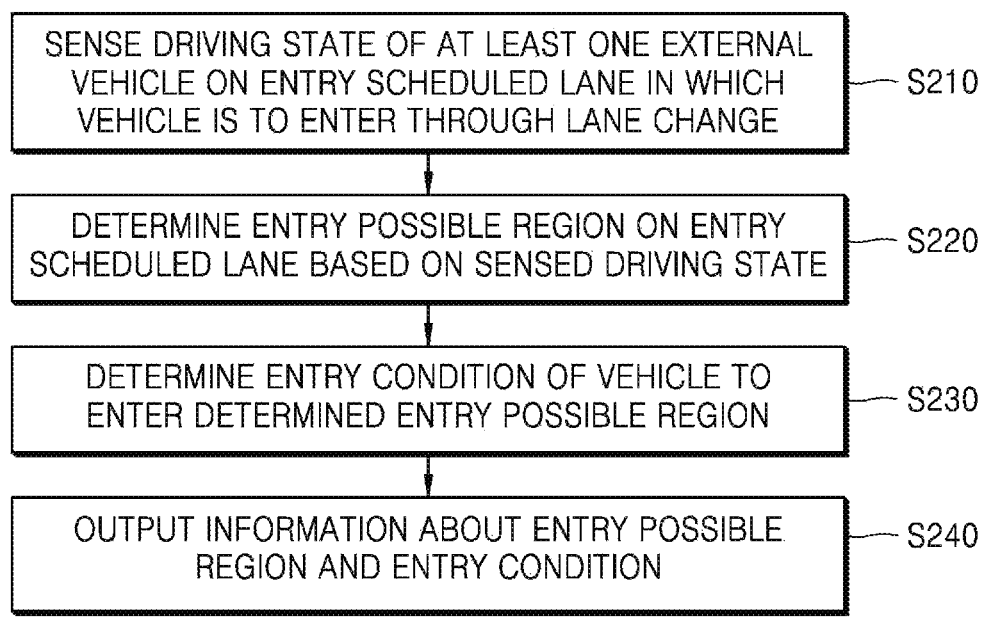
FIG. 2 is a flowchart of a method, performed by an electronic device, of assisting driving of a vehicle, according to an embodiment.

FIG. 2 is a flowchart of a method performed by an electronic device of assisting driving of a vehicle according to an embodiment.

In operation s210, the electronic device 100 may sense a driving state of at least one external vehicle on an entry scheduled lane in which the vehicle 1 is to enter through a lane change. That is, the electronic device 100 may sense a position, a speed, and an acceleration of the at least one external vehicle on the entry scheduled lane. For example, the electronic device 100 may use a distant sensor to sense the position, the speed, and the acceleration of the at least one external vehicle. The electronic device 100 may also sense an orientation of the at least one external vehicle, a shaking state of the at least one external vehicle such as yaw, roll and pitch, and (in case where the at least one external vehicle is not an unmanned vehicle) a driver condition of the at least one external vehicle or the like.

Further, the electronic device 100 may recognize the entry scheduled lane in which the vehicle 1 is to change through the lane change, and may sense the driving state of the at least one external vehicle on the recognized entry scheduled lane.

In operation s220, the electronic device 100 may determine an entry possible region on the entry scheduled lane based on the driving state sensed in operation s210. The entry possible region may mean a region suitable for the vehicle 1 to enter by changing the lane. The electronic device 100 may determine the entry possible region in consideration of at least one of the position, the speed, and the acceleration of the at least one external vehicle on the entry scheduled lane.

The electronic device 100 may calculate a vehicle interval between external vehicles considering the sensed position of the at least one external vehicle. For example, the electronic device 100 may sense a distance between the vehicle 1 and each of a front vehicle and a rear vehicle among the external vehicles forming the vehicle interval. Subsequently, the electronic device 100 may calculate a vehicle interval between the front vehicle and the rear vehicle according to trigonometry using the distance between the front vehicle and the vehicle 1 and the distance between the rear vehicle and the vehicle 1.

The electronic device 100 may determine the entry possible region in consideration of the vehicle interval between the external vehicles. Specifically, the electronic device 100 may determine a region between the external vehicles forming the vehicle interval as the entry possible region, according to whether the vehicle interval is equal to or greater than a predetermined length. The predetermined length may be set in consideration of an overall length of the vehicle 1. Further, the electronic device 100 may determine the entry possible region in consideration of a degree of change of the vehicle interval as well as the vehicle interval. For example, when a speed of the front vehicle is slow or a speed of the rear vehicle is fast such that the vehicle interval is reduced, the electronic device 100 may exclude a region between the external vehicles forming the reduced vehicle interval from the entry possible region even though the vehicle interval is equal to or greater than the predetermined length.

The electronic device 100 may determine the entry possible region on the entry scheduled lane in consideration of the sensed driving state of the at least one external vehicle as well as a driving state of the vehicle 1. For example, even though the vehicle interval is equal to or greater than the predetermined length, when a position of the vehicle interval is distant from a position of the vehicle 1 by a certain distance or more, the electronic device 100 may exclude the region between the external vehicles forming the reduced vehicle interval from the entry possible region. Further, when driving speeds of the front and rear external vehicles are faster than the driving speed of the vehicle 1 by a certain speed or more, the electronic device 100 may exclude the region between the front and rear external vehicles from the entry possible region.

Also, the electronic device 100 may continue to sense the driving state of the external vehicles on the entry scheduled lane, even after determining the entry possible region. As a result of sensing, the electronic device 100 may change the entry possible region when the predetermined entry possible region is determined to be in an entry impossible state.

In operation s230, the electronic device 100 may determine an entry condition of the vehicle 1 to enter the entry possible region determined at S220. The entry condition may include at least one of a position of the vehicle 1 on the driving lane for entering from the driving lane to the entry possible region, a time for the vehicle 1 to enter the entry possible region, and a speed of the vehicle 1 to enter the entry possible region, but is not limited to thereto.

In operation s240, the electronic device 100 may output information about the entry possible region determined in operation s220 and the entry condition determined in operation s230. Specifically, the electronic device 100 may output information about at least one of a position, a viewpoint, a speed, an acceleration, and a direction of the vehicle 1 to enter the entry possible region and provide the information to the driver. According to an example, the electronic device 100 may display and output information, through a display, that guides the driver to enter the entry possible region according to the entry condition. According to another example, the electronic device 100 may project, through a head-up-display, information that guides the driver to enter the entry possible region according to the entry condition onto a car window. According to another example, the electronic device 100 may output, through a sound output device, information that guides the driver to enter the entry possible region according to the entry condition.

However, when there is no entry possible region on the entry scheduled lane, the electronic device 100 may provide information informing that entry into the entry scheduled lane is currently impossible to the driver.

Figure 3:
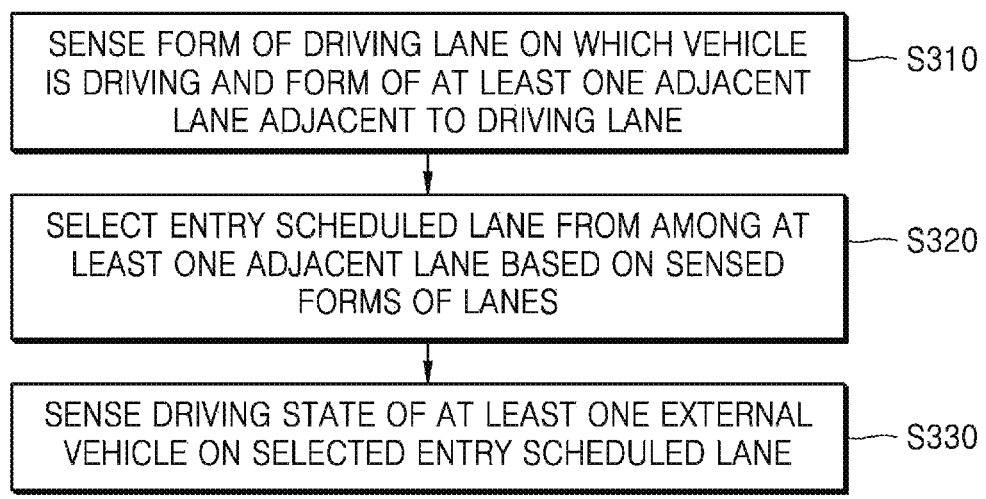
FIG. 3 is a flowchart of a method, performed by an electronic device, of recognizing an entry scheduled lane, according to an embodiment.

FIG. 3 is a flowchart of a method performed by an electronic device of recognizing an entry scheduled lane according to an embodiment.

In operation s310, the electronic device 100 may sense a form of a driving lane on which the vehicle 1 is driving and a form of at least one adjacent lane adjacent to the driving lane. For example, the electronic device 100 may use an image sensor to sense the form of the driving lane and the form of the at least one adjacent lane adjacent to the driving lane. For example, a form of a lane may include a shape of the lane, a width of the lane, a curvature of the lane, and the like. The electronic device 100 may sense the form of the driving lane and the form of the at least one adjacent lane adjacent to the driving lane, thereby recognizing a change in the shape of the lane, a change in the width of the lane, whether the lane joins another lane, and a form of a joining lane.

In operation s320, the electronic device 100 may select the entry scheduled lane from among the at least one adjacent lane based on the forms of the driving lane and the adjacent lane sensed in operation s310. The electronic device 100 may recognize in advance the entry scheduled lane of the vehicle 1 and select the entry scheduled lane from among the at least one adjacent lane based on the sensed forms of the driving lane and the adjacent lane. For example, the electronic device 100 may recognize a number change or a curvature change in the lane based on the forms of the driving lane and the adjacent lane sensed in operation s310, and select the entry scheduled lane from among the at least one adjacent lane through the recognized number change or curvature change.

Also, according to an embodiment, the electronic device 100 may determine an entry scheduled lane adjacent to the driving lane by sensing a marker displayed on a signboard located around the vehicle 1, a guard rail, or the driving lane. Further, the electronic device 100 may sense a landing mark such as a building, a bridge, a tunnel, a curbstone, or a signboard in the vicinity to determine the entry scheduled lane adjacent to the driving lane.

In operation s330, the electronic device 100 may sense a driving state of at least one external vehicle on the entry scheduled lane selected in operation s320.

Therefore, the electronic device 100 may recognize the entry scheduled lane of the vehicle 1 without any additional input from a driver, and as a result, guide the driver an entry condition for entering an entry possible region on the recognized entry scheduled lane, thereby providing convenience and safety with respect to driving of the vehicle 1.

Figure 4:
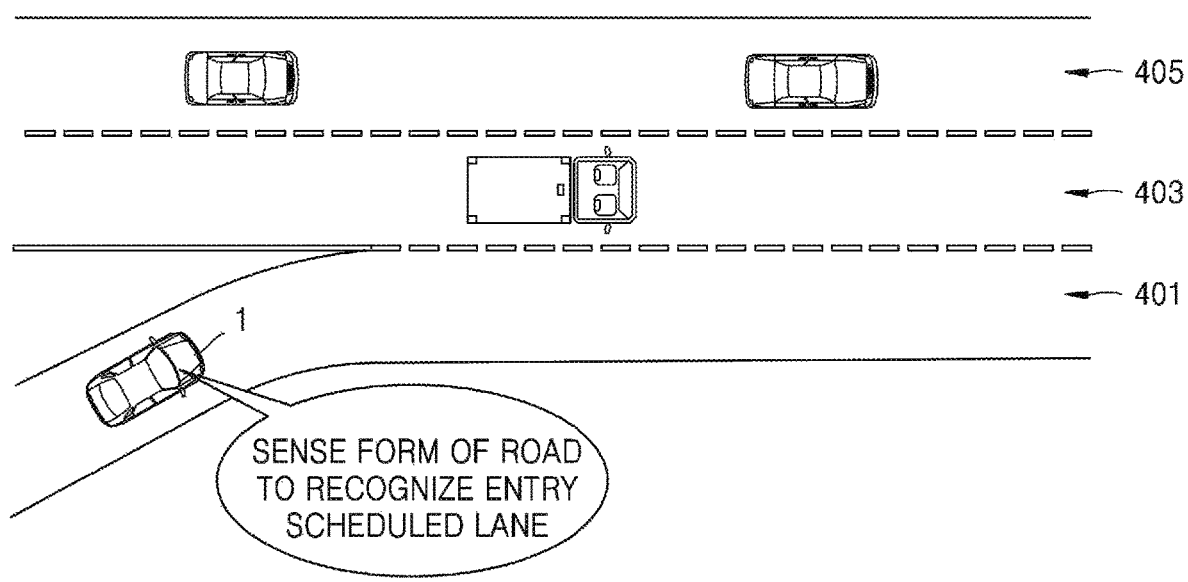
FIG. 4 illustrates an embodiment in which an electronic device recognizes an entry scheduled lane.

FIG. 4 illustrates an embodiment in which an electronic device recognizes an entry scheduled lane.

The electronic device 100 may sense a form of a current driving lane 401 of the vehicle 1 and forms of at least one adjacent lane 403 and 405 adjacent to the current driving lane 401. As a result of sensing, the electronic device 100 may recognize a situation where the vehicle 1 currently must enter a two-lane highway through an entry ramp. Specifically, the electronic device 100 may recognize a change in the number of neighboring lanes and a change in a curvature of the current driving lane 401 as a result of sensing the form of the current driving lane 401 and the forms of the at least one adjacent lane 403 and 405, and recognize that the vehicle 1 must enter a lane adjacent to the current driving lane 401.

Subsequently, the electronic device 100 may select the lane 403 from among the at least one adjacent lane 403 and 405 as the entry scheduled lane, based on the sensed current driving lane 401 and at least one adjacent lane 403 and 405. Specifically, the electronic device 100 may select the lane 403 closest to the current driving lane 401 as the entry scheduled lane based on the sensed current driving lane 401 and at least one adjacent lane 403 and 405.

Figure 5:
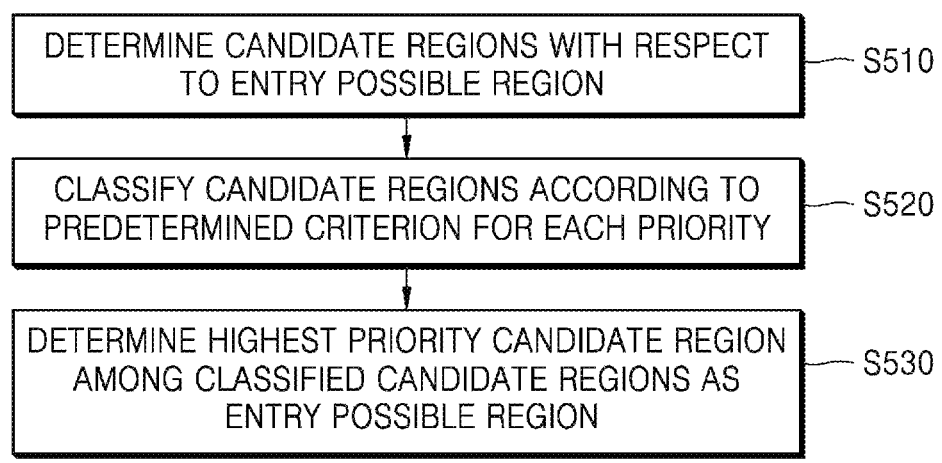
FIG. 5 is a flowchart of a method, performed by an electronic device, of determining an entry possible region through candidate regions, according to an embodiment.

FIG. 5 is a flowchart of a method performed by an electronic device of determining an entry possible region through candidate regions according to an embodiment.

In operation s510, the electronic device 100 may determine the candidate regions with respect to the entry possible region based on driving states of external vehicles on an entry scheduled lane. That is, the electronic device 100 may first determine the candidate regions prior to determining the entry possible region. For example, the electronic device 100 may determine regions corresponding to respectively vehicle intervals between the external vehicles on the entry scheduled lane as the candidate areas.

In operation s520, the electronic device 100 may classify the candidate regions determined in operation s510 according to a predetermined criterion for each priority. Specifically, the electronic device 100 may classify N candidate regions into first to N-th candidate regions according to the predetermined criteria.

According to an example, the electronic device 100 may classify the candidate regions for each priority based on a length of the vehicle interval corresponding to each of the candidate regions. Specifically, the electronic device 100 may determine a candidate region corresponding to a relatively long vehicle interval among the candidate regions as a prior candidate region, and determine a candidate region corresponding to a relatively short vehicle interval as a posterior entry possible region. Therefore, the electronic device 100 may determine a candidate region corresponding to a longest vehicle interval among the candidate regions as a highest priority candidate region.

According to another example, the electronic device 100 may classify the candidate regions for each priority in consideration of a driving state of the vehicle 1. Specifically, the electronic device 100 may classify the candidate regions for each priority based on a rate of change in a driving speed of the vehicle 1. For example, the electronic device 100 may determine a candidate region in which the vehicle 1 should enter without a variation in the rate of change of a current driving speed as the prior candidate region and determine the entry possible region in which the vehicle 1 should enter by increasing the rate of change of the current driving speed as the posterior candidate region.

According to another example, the electronic device 100 may classify the candidate regions for each priority, simultaneously considering a length of a vehicle interval corresponding to each of the candidate regions and the driving state of the vehicle 1. Specifically, the electronic device 100 may determine, as the highest priority candidate region, a candidate region in which the vehicle 1 is first able to enter among the candidate regions having a vehicle interval equal to or greater than a predetermined value. Also, the electronic device 100 may determine, as the highest priority candidate region, a candidate region in which the vehicle interval gradually increases and the vehicle 1 is able to enter after a predetermined period of time even though the candidate region has the vehicle interval less than the predetermined value.

In operation s530, the electronic device 100 may determine the highest priority candidate region among the classified candidate regions as the entry possible region.

Figure 6:
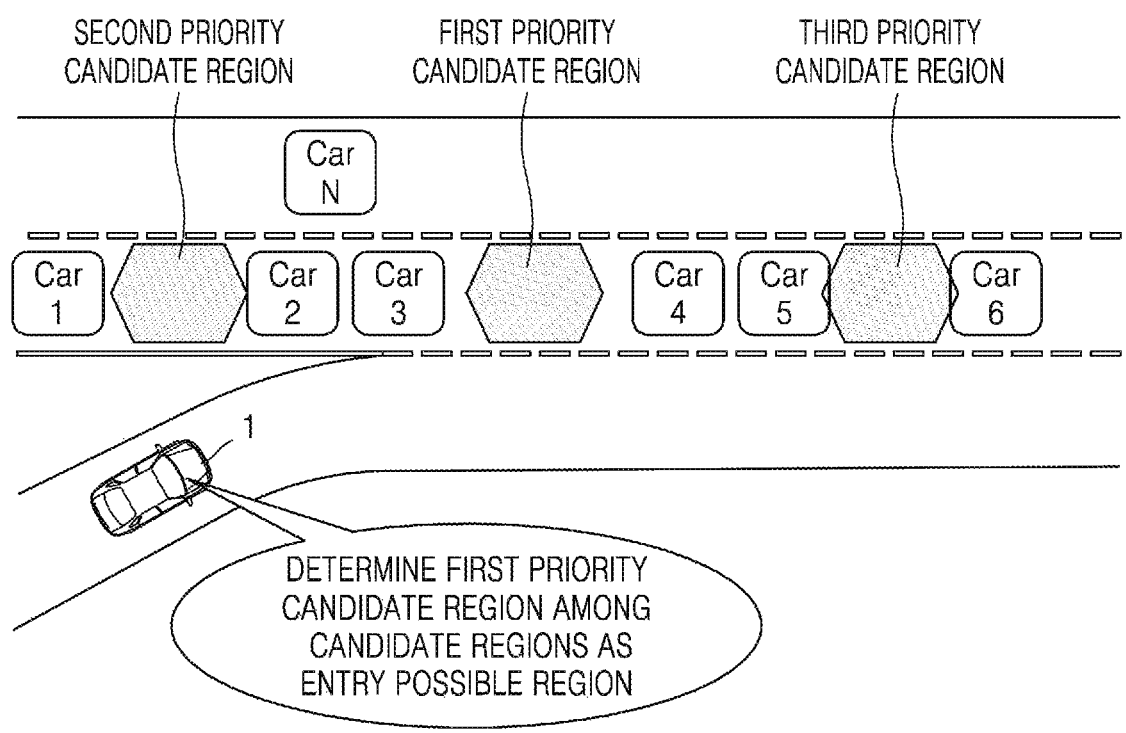
FIG. 6 illustrates an embodiment in which an electronic device determines an entry possible region through candidate regions.

FIG. 6 illustrates an embodiment in which an electronic device determines an entry possible region through candidate regions.

The electronic device 100 may determine the candidate regions with respect to the entry possible region based on driving states of external vehicles Car 1 to Car 6 on an entry scheduled lane. That is, the electronic device 100 may determine a vehicle interval between the external vehicles Car 1 and Car 2, a vehicle interval between the external vehicles Car 3 and Car 4, and a vehicle interval between the external vehicles Car 5 and Car 6 that satisfy a predetermined length or more among the vehicle intervals between the external vehicles Car 1 to Car 6, as the candidate regions with respect to the entry possible region.

Thereafter, the electronic device 100 may classify the candidate regions according to a predetermined criterion for each priority and determine a first candidate region, a second candidate region, and a third candidate region. Specifically, because the vehicle interval between the external vehicles Car 3 and Car 4 is a longest vehicle interval, the electronic device 100 may determine a region corresponding to the vehicle interval between the external vehicles Car 3 and Car 4 as the first candidate region, because the vehicle interval between the external vehicles Car 1 and Car 2 is a second long vehicle interval, the electronic device 100 may determine a region corresponding to the vehicle interval between the external vehicles Car 1 and Car 2 as the second candidate region, and because the vehicle interval between the external vehicles Car 5 and Car 6 is a third long vehicle interval, the electronic device 100 may determine a region corresponding to the vehicle interval between the external vehicles Car 5 and Car 6 as the third candidate region.

Also, according to another example, the electronic device 100 may determine a region corresponding to the vehicle interval between the external vehicles Car 3 and Car 4 as the first candidate region, may determine a region corresponding to the vehicle interval between the external vehicles Car 1 and Car 2 as the second candidate region, and may determine a region corresponding to the vehicle interval between the external vehicles Car 5 and Car 6 as the third candidate region, in consideration of a degree of change in the vehicle interval due to a change in the speed or the acceleration of a vehicle.

According to another example, the electronic device 100 may determine the first candidate region, the second candidate region, and the third candidate region in consideration of a shaking state of front and rear vehicles forming the vehicle interval.

Therefore, the electronic device 100 may determine the first candidate region of the candidate regions as the entry possible region.

Figure 7:
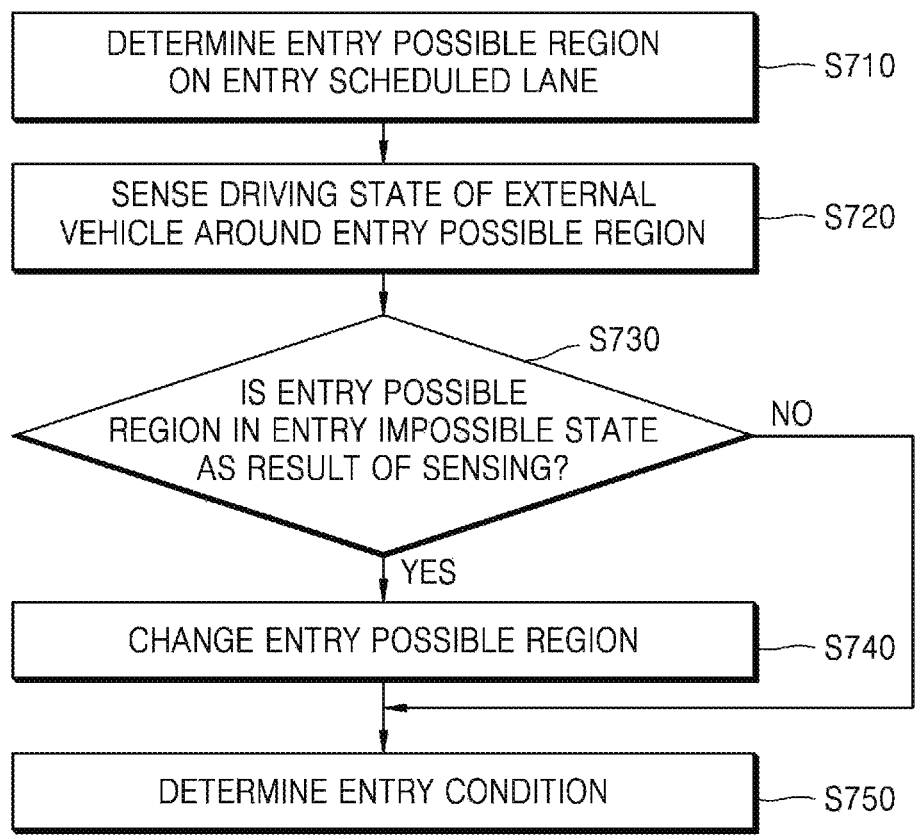
FIG. 7 illustrates a flowchart of a method, performed by an electronic device, of changing an entry possible region, according to an embodiment.

FIG. 7 illustrates a flowchart of a method performed by an electronic device of changing an entry possible region according to an embodiment.

In operation s710, the electronic device 100 may determine the entry possible region on an entry scheduled lane. For example, the electronic device 100 may determine a first candidate region of candidate regions on the entry scheduled lane as the entry possible region.

In operation s720, the electronic device 100 may sense a driving state of an external vehicle around the entry possible region determined in operation s710. After the electronic device 100 determines the entry possible region in operation s710, the electronic device 100 may continue to sense the external vehicle around the determined entry possible region. For example, until a distance between the vehicle 1 and the entry possible region is within a certain distance, the electronic device 100 may continue to sense the external vehicle around the determined entry possible region. Further, the electronic device 100 may sense a direction of the external vehicle around the entry possible region, a shaking state, and a driver condition of the external vehicle.

In operation s730, the electronic device 100 may determine whether the entry possible region determined in operation s710 is in an entry impossible state as a result of sensing in operation s720. For example, as a result of sensing in operation s720, when the external vehicle enters the entry possible region at a side lane to the entry scheduled lane, the electronic device 100 may determine the entry possible region determined in operation s710 to be in the entry impossible state. For another example, as a result of sensing in operation s720, when the entry possible region is reduced due to speed changes of front and rear external vehicles forming the entry possible region, the electronic device 100 may determine the entry possible region determined in operation s710 to be in the entry impossible state.

Further, as a result of sensing in operation s720, the electronic device 100 may determine the entry possible region determined in operation s710 to be in the entry impossible state, based on a shaking state of a vehicle around the entry possible region, or a driver condition. For example, the electronic device 100 may determine the entry possible region determined in operation s710 to be in the entry impossible state when a degree of shaking of the vehicle around the entry possible region is equal to or greater than a predetermined value, or when a driver is in a drowsy state.

In operation s740, when it is determined that the entry possible region is in the entry impossible state in operation s730, the electronic device 100 may change the entry possible region. For example, because the first candidate region of the candidate regions on the entry scheduled lane is in the entry impossible state, the electronic device 100 may re-determine a second candidate region of the candidate regions into the entry possible region.

In operation s750, when it is determined that the entry possible region is not in the entry impossible state in operation s730, the electronic device 100 may determine an entry condition for entry of the vehicle 1 into the entry possible region.

Figure 8:
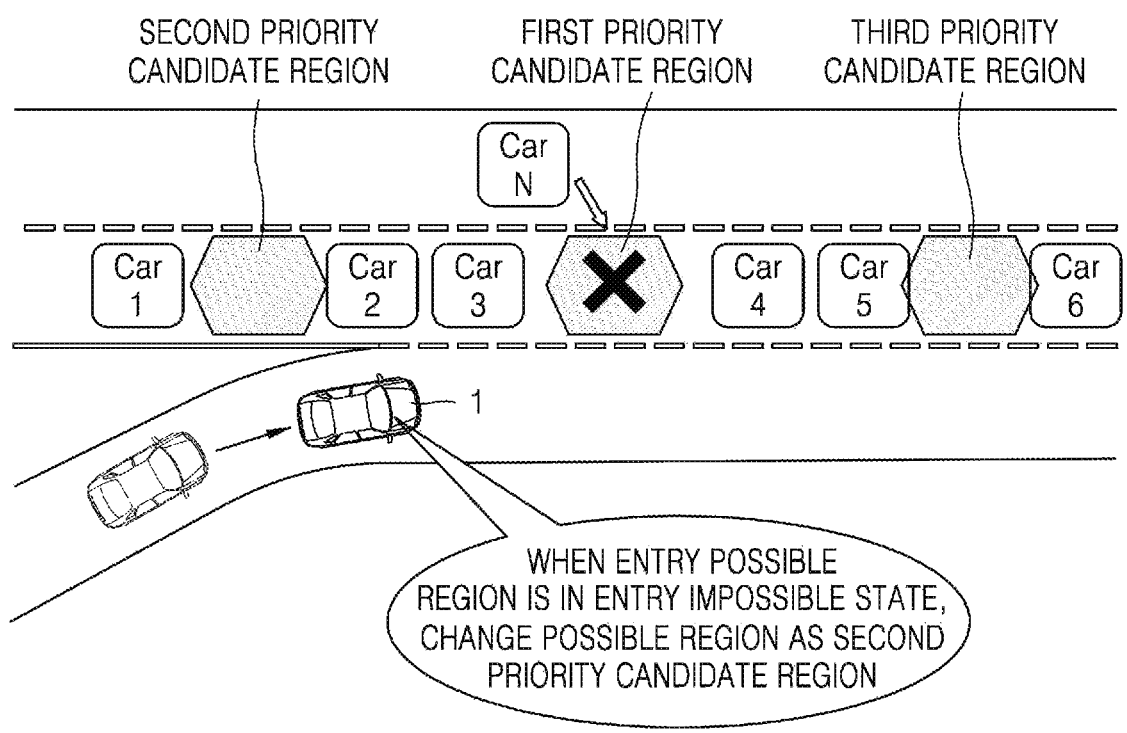
FIG. 8 illustrates an embodiment in which an electronic device changes an entry possible region.

FIG. 8 illustrates an embodiment in which an electronic device changes an entry possible region.

As shown in FIG. 6, the electronic device 100 may determine a first candidate region of candidate regions as the entry possible region. Subsequently, the electronic device 100 may continue to sense an external vehicle around the entry possible region until a distance between the vehicle 1 and the entry possible region is within a certain distance. For example, the electronic device 100 may sense the external vehicles Car 3 and Car 4 in front of and rear of the entry possible region, and may sense an external vehicle Car N located on a side lane of an entry scheduled lane.

Also, the electronic device 100 may continue to sense a speed change, a shaking state, etc. of the external vehicle around the entry possible region. Accordingly, the electronic device 100 may predict an accident that may occur due to the shaking state of the external vehicle, etc. As a result of sensing, because the electronic device 100 may sense a driving state of the external vehicle Car N that enters the entry possible region, the electronic device 100 may determine that the entry possible region is in an entry impossible state.

Accordingly, the electronic device 100 may change the entry possible region, and may re-determine a second candidate region out of the candidate regions as the entry possible region.

Figure 9:
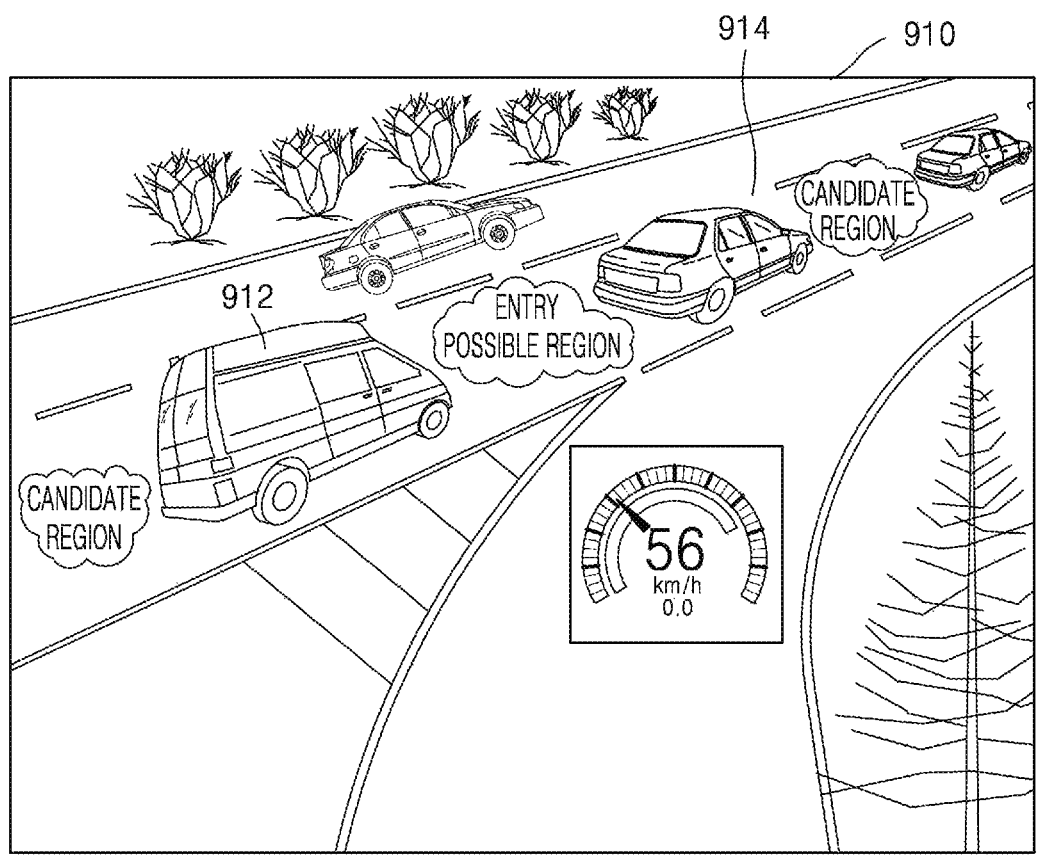
FIG. 9 illustrates an embodiment in which an electronic device outputs information about an entry possible region and an entry condition.

FIG. 9 illustrates an embodiment in which an electronic device outputs information about an entry possible region and an entry condition.

The electronic device 100 may display the information about the entry possible region and the entry condition on a front window 910 through a head-up display. Specifically, the electronic device 100 may project an image guiding the entry possible region among candidate regions and the entry condition onto the front window 910, and may allow a driver to recognize the entry possible region and the entry condition when the driver looks at the front window 910.

As shown in FIG. 9, in a situation in which the vehicle 1 enters a highway via an entry ramp, the electronic device 100 may determine a region corresponding to a vehicle interval between an external vehicle 912 and an external vehicle 914 appearing in the front window 910 as the entry possible region, and may determine a speed of 56 km that is the entry condition for entering the entry possible region. Thus, as shown in FIG. 9, the electronic device 100 may project the image guiding the entry possible region and the entry condition onto the front window 910.

Therefore, the driver may recognize the entry possible region and the entry condition while watching forward, and may change a driving lane according to the entry possible region and the entry condition.

Figure 10A:
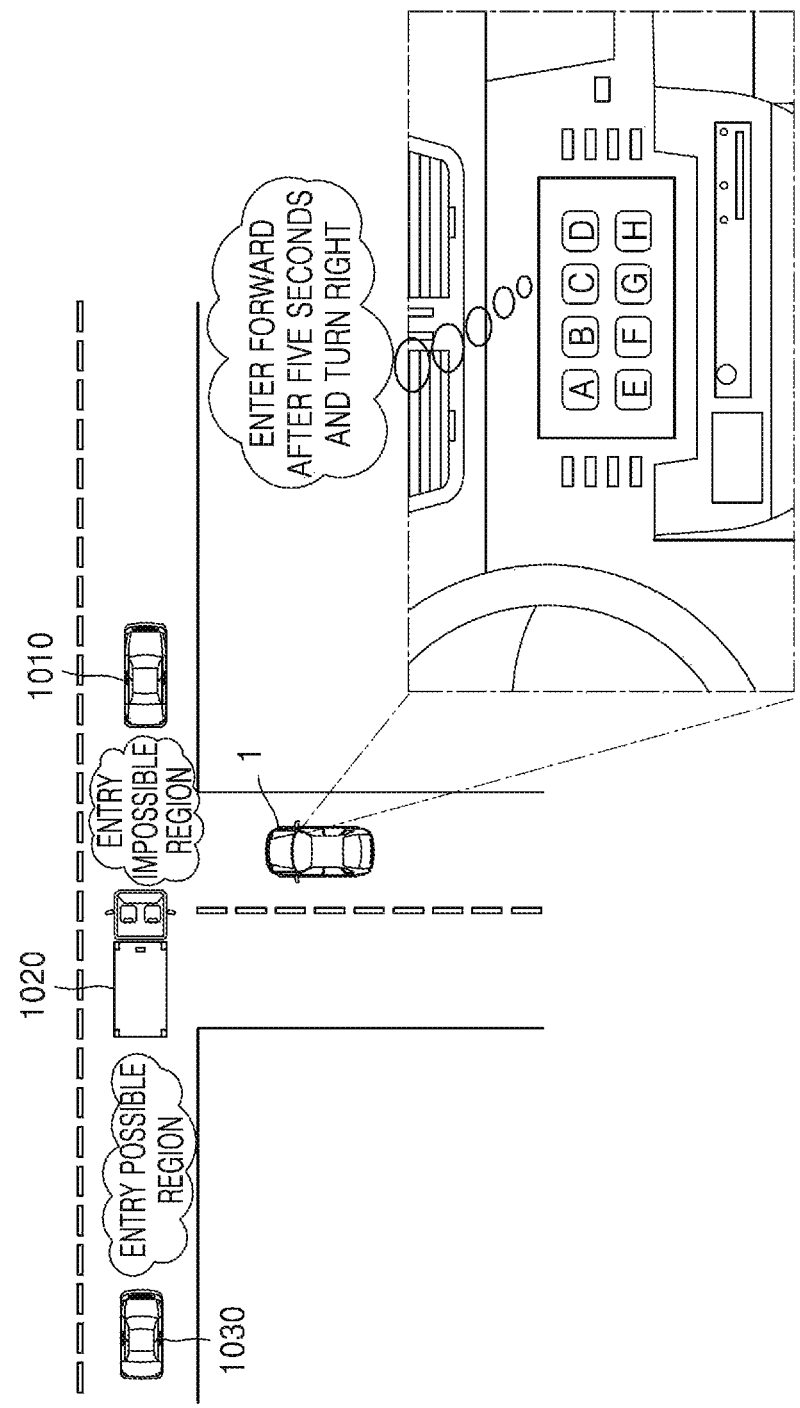
FIGS. 10A and 10B illustrate another embodiment in which an electronic device assists driving of a vehicle.
Figure 10B:
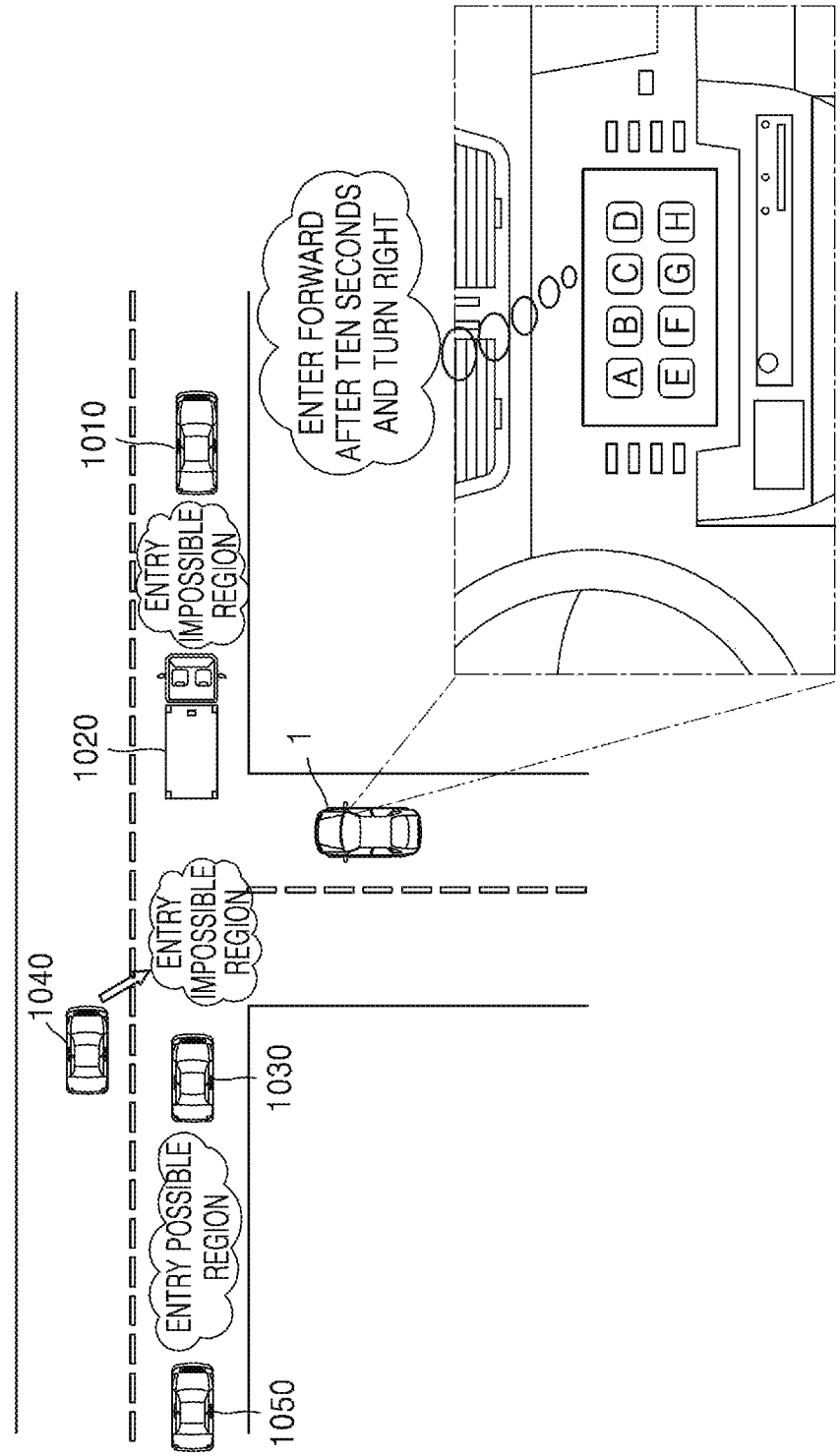

FIGS. 10A and 10B illustrate another embodiment in which an electronic device assists driving of the vehicle 1.

First, as shown in FIG. 10A, at a T-shaped intersection, a driver must drive the vehicle 1 and turn right at a current driving lane to enter an entry scheduled lane.

In this case, the electronic device 100 included in the vehicle 1 may sense a form of the driving lane while driving and a form of at least one lane adjacent to the driving lane to recognize the entry scheduled lane. In other words, the electronic device 100 may recognize a nearest front horizontal lane as the entry scheduled lane through the sensed form of the lane.

Subsequently, the electronic device 100 may sense a driving state of at least one external vehicle on the entry scheduled lane. That is, the electronic device 100 may determine an entry possible region, considering at least one of a position, speed, and acceleration of the sensed at least one external vehicle. As shown in FIG. 10, the electronic device 100 may sense positions and speeds of external vehicles 1010, 1020 and 1030, determine a region corresponding to a vehicle interval between the external vehicle 1010 and the external vehicle 1020 as an entry impossible region and determine a region corresponding to the external vehicle 1020 and the external vehicle 1030 as the entry possible region.

Subsequently, the electronic device 100 may determine an entry condition for entry of the vehicle 1 into the predetermined entry possible region. That is, the electronic device 100 may determine a time point at which the vehicle 1 enters the region corresponding to the vehicle interval between the external vehicle 1010 and the external vehicle 1020 as 'after 5 seconds'.

Thus, the electronic device 100 may guide the driver to the predetermined entry possible region and the entry condition. As shown in FIG. 10A, the electronic device 100 may output a voice to guide the driver to 'enter forward after five seconds and turn right' through a voice output device.

However, as shown in FIG. 10B, the electronic device 100 may sense an external vehicle around the predetermined entry possible region even after determining and outputting the entry possible region and the entry condition in FIG. 10B. For example, the electronic device 100 may sense an external vehicle 1040 located on a side lane to the entry scheduled lane.

As a result of sensing, because the electronic device 100 may sense a driving state in which the external vehicle 1040 enters the entry possible region, the electronic device 100 may determine that the entry possible region is in an entry impossible state.

Therefore, the electronic device 100 may change the entry possible region into a region corresponding to a vehicle interval between the external vehicle 1040 and the external vehicle 1050. Also, the electronic device 100 may re-determine the entry condition for entry of the vehicle 1 into the changed entry possible region. That is, the electronic device 100 may change a time point at which the vehicle 1 enters a region corresponding to a vehicle interval between the external vehicle 1030 and the external vehicle 1050 to 'after 10 seconds'.

Subsequently, the electronic device 100 may guide the driver to the changed entry possible region and entry condition. As shown in FIG. 10B, the electronic device 100 may output a voice to guide the driver to 'enter forward after ten seconds and turn right' through the voice output device.

Figure 11:
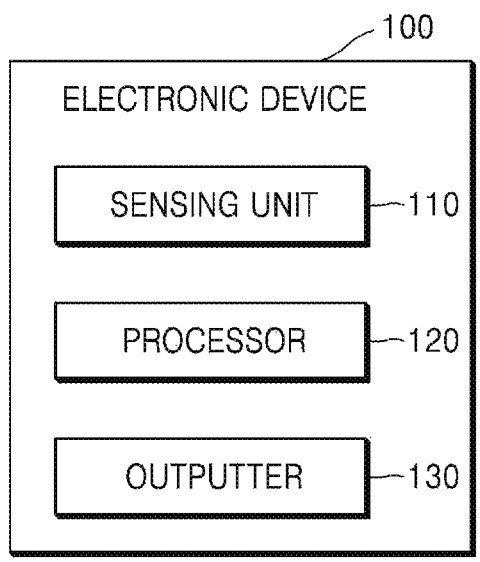
FIG. 11 is a block diagram of an electronic device for assisting a driver of a vehicle, according to an embodiment.

FIG. 11 is a block diagram of an electronic device for assisting a driver of the vehicle 1 according to an embodiment.

According to an embodiment, the electronic device 100 may include a sensing unit 110, a processor 120, and an outputter 130. The electronic device 100 shown in FIG. 11 includes only components related to the present embodiment. Therefore, it will be understood by one of ordinary skill in the art that other general-purpose components than the components shown in FIG. 11 may be further included.

The sensing unit 110 may sense a driving state of at least one external vehicle on an entry scheduled lane that the vehicle 1 is to enter through a lane change. That is, the electronic device 100 may sense a position, speed, and acceleration of the at least one external vehicle on the entry scheduled lane. The sensing unit 110 may include a plurality of sensors for sensing the driving state of the at least one external vehicle. For example, the sensing unit 110 may include a distance sensor such as a RADAR sensor and a LIDAR sensor, and an image sensor such as a camera. Also, the sensing unit 110 may include one or more actuators configured to modify positions and/or orientations of the plurality of sensors to sense the driving state of the external vehicle located in the front, rear, and side of the vehicle 1.

Also, the sensing unit 110 may sense a form of a driving lane while the vehicle 1 is driving and a form of at least one lane adjacent to the driving lane. For example, the sensing unit 110 may sense the form of the driving lane and the form of the at least one lane adjacent to the driving lane using an image sensor.

The processor 120 may recognize the entry scheduled lane in advance based on the form of the lane sensed by the sensing unit 110 and may select the entry scheduled lane from the at least one lane adjacent to the driving lane.

The processor 120 may determine an entry possible region on the entry scheduled lane based on the driving state of the at least one external vehicle sensed by the sensing unit 110. Specifically, the electronic device 100 may determine the entry possible region, considering at least one of a position, a speed, and an acceleration of at least one external vehicle on the entry schedule lane.

The processor 120 may determine candidate regions with respect to the entry possible region based on the driving state of the external vehicles on the entry scheduled lane. That is, the processor 120 may first determine the candidate regions prior to determining the entry possible region. Subsequently, the processor 120 may classify the determined candidate regions for each priority according to a predetermined criterion. Subsequently, the processor 120 may determine a highest priority candidate region among the classified candidate regions as the entry possible region. According to an embodiment, the processor 120 may include at least one processor.

The sensing unit 110 may sense a driving state of an external vehicle around the entry possible region determined by the processor 120. Even after the entry possible region is determined by the processor 120, the sensing unit 110 may continue to sense the external vehicle around the determined entry possible region. As a result of sensing, the processor 120 may determine whether the predetermined entry possible region is in an entry impossible state, and when the predetermined entry possible region is in the entry impossible state, may change the entry possible region.

The processor 120 may determine an entry condition for entry of the vehicle 1 into the determined entry possible region. The entry condition may include at least one of a position on the driving lane for the vehicle 1 to enter the entry possible region from the driving lane, a time for the vehicle 1 to enter the entry possible region, and a speed for the vehicle 1 to enter the entry possible region, and the like.

The outputter 130 may output an audio signal or a video signal. The outputter 130 may include at least one of a display, a head-up display, and a sound output device.

The outputter 130 may output information about the entry possible region and the entry condition determined by the processor 120. According to an example, the display of the outputter 130 may display and output information used to guide the entry into the entry possible region according to the entry condition. According to another example, the head-up display of the outputter 130 may display and output the information used to guide the entry into the entry possible region according to the entry condition on and to a front window of the vehicle 1 as an image. According to another example, the sound output device of the outputter 130 may output the information used to guide the entry into the entry possible region according to the entry condition as a voice.

Figure 12:
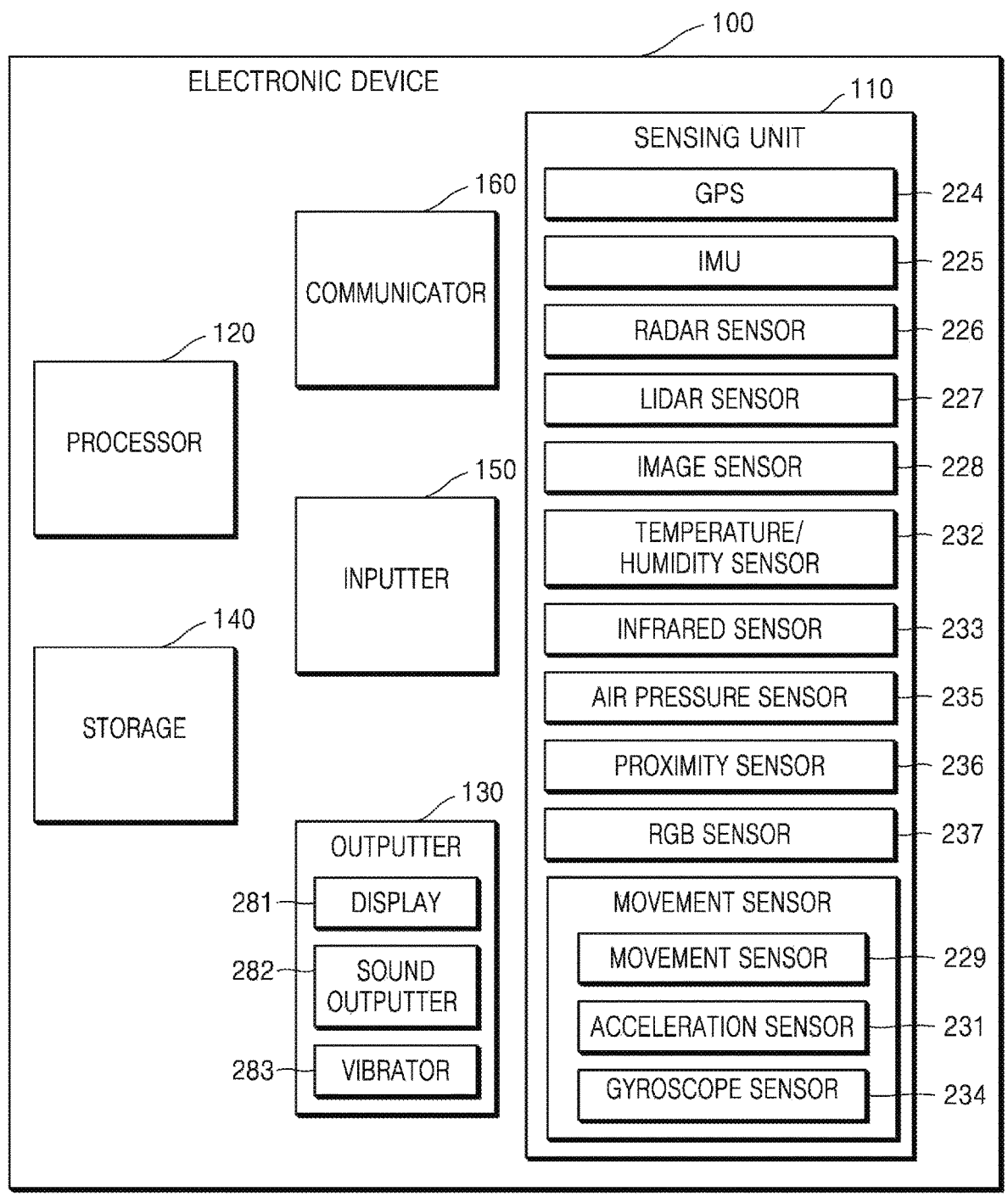
FIG. 12 is a block diagram of an electronic device for assisting a driver of a vehicle, according to another embodiment.

FIG. 12 is a block diagram of an electronic device for assisting with driving of the vehicle 1 according to another embodiment.

The electronic device 100 may include the sensing unit 110, the processor 120, the outputter 130, a storage 140, and inputter 150, and a communicator 160.

The sensing unit 110 may include a plurality of sensors configured to sense information about an environment in which the vehicle 1 is located and may include one or more actuators configured to modify positions and/or orientations of the sensors. For example, the sensing unit 110 may include a global positioning system (GPS) 224, an inertial measurement unit (IMU) 225, a RADAR sensor 226, a LiDAR sensor 227, and an image sensor 228. According to an embodiment, the image sensor 228 may include a camera, a stereo camera, a mono camera, a wide angle camera, or a 3D vision sensor. Also, the image sensor 228 may include at least one of a temperature/humidity sensor 232, an infrared sensor 233, an air pressure sensor 235, a proximity sensor 236, and an RGB sensor 237, but is not limited thereto. The sensing unit 110 may also be configured as a combination of the image sensor 228 and the RADAR sensor 226 or a combination of the image sensor 228 and the LiDAR sensor 227. A function of each sensor may be intuitively deduced from the name by one of ordinary skill in the art, and thus a detailed description thereof is omitted.

Also, the sensing unit 110 may include a movement sensor 238 capable of sensing a movement of the vehicle 1. The movement sensor 238 may include a magnetic sensor 229, an acceleration sensor 231, and a gyroscope sensor 234.

The GPS 224 may be a sensor configured to estimate a geographic location of the vehicle. That is, GPS 224 may include a transceiver configured to estimate the location of the vehicle 1 relative to the earth.

The IMU 225 may be a combination of sensors configured to sense location and orientation changes of the vehicle 1 based on the inertial acceleration. For example, the combination of sensors may include accelerometers and gyroscopes.

The RADAR sensor 226 may be a sensor configured to use wireless signals to sense objects within the environment in which the vehicle 1 is located. Also, the RADAR sensor 226 may be configured to sense speed and/or directions of the objects.

The LiDAR sensor 227 may be a sensor configured to use laser to sense the objects within the environment in which the vehicle 1 is located. More specifically, the LiDAR sensor 227 may include a laser light source and/or a laser scanner configured to emit a laser and a detector configured to detect reflection of the laser. The LiDAR sensor 227 may be configured to operate in a coherent (e.g., using heterodyne detection) or incoherent detection mode.

The image sensor 228 may include a still camera or a video camera configured to record an environment outside the vehicle 1. For example, the image sensor 228 may include multiple cameras. The multiple cameras may be located at multiple locations inside and outside of the vehicle 1.

The storage 140 may include a magnetic disk drive, an optical disk drive, and a flash memory. Alternatively, the storage 140 may be a portable USB data storage device. The storage 140 may store system software for executing examples related to the present disclosure. The system software for executing the examples related to the present disclosure may be stored on a portable storage medium.

The communicator 160 may include at least one antenna for wirelessly communicating with another device. For example, the communicator 160 may be used to communicate with a cellular network or other wireless protocols and systems wirelessly via Wi-Fi or Bluetooth. The communicator 160 controlled by the processor 120 may transmit and receive wireless signals. For example, the processor 120 may execute programs included in the storage 140 to allow the communicator 160 to transmit and receive wireless signals to and from the cellular network.

The inputter 150 means a unit that inputs data for controlling the vehicle 1. For example, the inputter 150 may include a key pad, a dome switch, a touch pad (contact type capacitance type, pressure type resistive type, infrared ray detection type, surface ultrasonic wave conduction type, an integral tension measurement type, a piezo effect type, etc.), a jog wheel, a jog switch, and the like, but is not limited thereto. Also, inputter 150 may include a microphone which may be configured to receive audio (e.g., voice commands) from a passenger of the vehicle 1.

The outputter 130 may output an audio signal or a video signal and may include a display 281, a sound outputter 282, and a vibrator 283.

The display 281 may include at least one of a liquid crystal display, a thin film transistor-liquid crystal display, an organic light-emitting diode display, a flexible display, a 3D display, and an electrophoretic display. Depending on the implementation of the outputter 130, the outputter 130 may include two or more displays 281.

The sound outputter 282 may output audio data received from the communicator 160 or stored in the storage 140. The sound outputter 282 may also include a speaker, a buzzer, and the like.

The vibrator 283 may generate physical vibration using electric energy.

The inputter 150 and the outputter 130 may include a network interface and may be implemented as a touch screen.

The processor 120 may execute the programs stored in the storage 140 to generally control the sensing unit 110, the communicator 160, the inputter 150, the storage 140, and the outputter 130.

Figure 13:
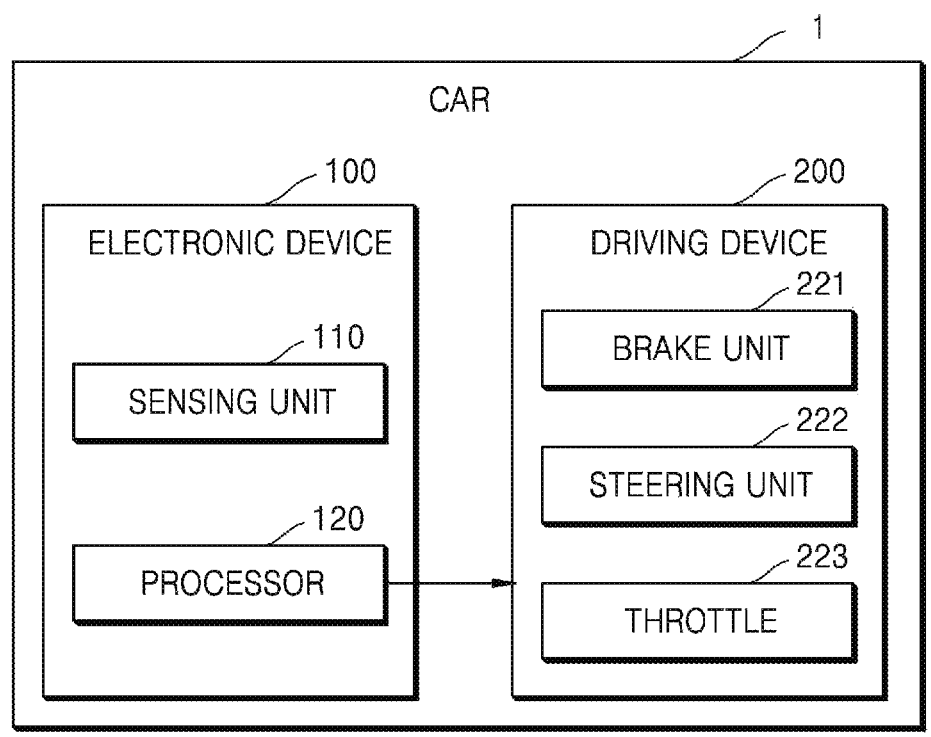
FIG. 13 is a block diagram of a vehicle according to an embodiment.

FIG. 13 is a block diagram of a vehicle according to an embodiment.

According to an embodiment, the vehicle 1 may include the electronic device 100 and a driving device 200. The vehicle 1 shown in FIG. 13 includes only components related to the present embodiment. Therefore, it will be understood by one of ordinary skill in the art that other general-purpose components than the components shown in FIG. 13 may be further included.

The electronic device 100 may include the sensing unit 110 and the processor 120.

The driving device 200 may include a brake unit 221, a steering unit 222, and a throttle 223.

The steering unit 222 may be a combination of mechanisms configured to adjust an orientation of the vehicle 1.

The throttle 223 may be a combination of mechanisms configured to control operating speeds of an engine and a motor to control a speed of the vehicle 1. Also, the throttle 223 may control an amount of a mixture gas of fuel air flowing into an engine/motor 211 by adjusting an opening amount of the throttle 223 and control power and thrust by adjusting the opening amount of the throttle 223.

The brake unit 221 may be a combination of mechanisms configured to decelerate the vehicle 1. For example, the brake unit 221 may use friction to reduce a speed of a wheel/tire 214.

The sensing unit 110 may sense a driving state of at least one external vehicle on an entry scheduled lane that the vehicle 1 is to enter through a lane change.

The processor 120 may determine an entry possible region on the entry scheduled lane based on the driving state sensed by the sensing unit 110 and determine an entry condition for entry of the vehicle 1 into the determined entry possible region.

The processor 120 may control the vehicle 1 to enter the entry possible region according to the determined entry condition. Specifically, the processor 120 may control the driving device 200 to allow the vehicle 1 to enter the entry possible region from a current driving lane to the entry scheduled lane. Therefore, the vehicle 1 may travel by itself without any intervention of a driver and may change the lane.

The device described herein may include a processor, a memory for storing program data to be executed by the processor, a permanent storage such as a disk drive, a communications port for handling communications with external devices, and user interface devices, including a display, keys, etc. When software modules or an algorithm are involved, these software modules or the algorithm may be stored as program commands or computer-readable code executable by the processor on a non-transitory computer-readable media such as read-only memory (ROM), random-access memory (RAM), CD-ROMs, magnetic tapes, floppy disks, and optical data storage devices. The computer-readable recording media may also be distributed over network coupled computer systems such that the computer-readable code is stored and executed in a distributed fashion. This media may be read by the computer, stored in the memory, and executed by the processor.

The embodiments may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure may employ any number of techniques according to the related art for electronics configuration, signal processing and/or control, data processing and the like. The words "mechanism" and "element" are used broadly and are not limited to mechanical or physical embodiments, but may include software routines in conjunction with processors, etc.

The invention claimed is:

1. An electronic device for assisting with driving of a vehicle, the electronic device comprising:
   an outputter;
   at least one sensor configured to sense a driving state of at least one external vehicle on an entry scheduled lane that the vehicle is to enter by changing lanes and a shaking state of the at least one external vehicle; and
   a processor configured to:
   based on the shaking state of the at least one external vehicle, determine whether a degree of shaking of the at least one external vehicle is less than a predetermined value, based on the driving state of the at least one external vehicle and the degree of shaking being less than the predetermined value, determine an entry possible region on the entry scheduled lane, determine candidate regions with respect to the entry possible region, classify each of the candidate regions with a priority based on a vehicle interval between external vehicles, select a highest priority candidate region among the classified candidate regions as the entry possible region, determine an entry condition comprising a speed and a direction of the vehicle required to enter the entry possible region, and control the outputter to output information about the entry possible region and the entry condition.

2. The electronic device of claim 1, wherein the at least one sensor is further configured to sense a driving state of an external vehicle around the entry possible region in real time, and wherein the processor is further configured to:

based on a result of sensing the driving state of the external vehicle in real time, determine whether the entry possible region is in an entry impossible state, and in response to determining the entry possible region as being in the entry impossible state, change the entry possible region.

3. The electronic device of claim 1, wherein the at least one sensor is further configured to:

sense a form of a driving lane in which the vehicle is driving, and sense a form of at least one adjacent lane adjacent to the driving lane, and wherein the processor is further configured to select the entry scheduled lane from among the at least one adjacent lane based on the sensed form of the driving lane and the sensed form of the at least one adjacent lane.

4. The electronic device of claim 1, wherein the processor is further configured to determine the entry possible region based on the driving state of the at least one external vehicle and the driving state of the vehicle.

5. The electronic device of claim 1, wherein the at least one sensor comprises a distance sensor, and wherein the at least one sensor is further configured to sense at least one of a position, a speed, an acceleration, or a direction of the at least one external vehicle by using the distance sensor.

6. The electronic device of claim 1, wherein the entry condition comprises at least one of a position of the vehicle on a driving lane for entering from the driving lane to the entry possible region, a time for the vehicle to enter the entry possible region, or an acceleration of the vehicle to enter the entry possible region.

7. The electronic device of claim 1, wherein the outputter comprises at least one of:

a display displaying and outputting, as an image, information that guides an entry into the entry possible region according to the entry condition;

a head-up-display projecting, as an image, the information that guides the entry into the entry possible region according to the entry condition onto a car window of the vehicle; or a sound output device outputting, as a voice, the information that guides the entry into the entry possible region according to the entry condition.

8. The electronic device of claim 1, wherein the processor is further configured to control a driving device of the vehicle such that the vehicle enters the entry possible region according to the entry condition.

9. A method of assisting a driver of a vehicle, the method comprising:

sensing a driving state of at least one external vehicle on an entry scheduled lane that the vehicle is to enter by changing lanes and a shaking state of the at least one external vehicle;

based on the shaking state of the at least one external vehicle, determine whether a degree of shaking of the at least one external vehicle is less than a predetermined value;

based on the driving state of the at least one external vehicle and the degree of shaking being less than the predetermined value, determining an entry possible region on the entry scheduled lane;

determining candidate regions with respect to the entry possible region;

classifying each of the candidate regions with a priority based on a vehicle interval between external vehicles;

selecting a highest priority candidate region among the classified candidate regions as the entry possible region;

determining an entry condition comprising a speed and a direction of the vehicle required to enter the entry possible region; and outputting information about the entry possible region and the entry condition.

10. The method of claim 9, wherein the determining of the entry possible region comprises:

sensing a driving state of an external vehicle around the entry possible region in real time;

based on a result of sensing the driving state of the external vehicle in real time, determining whether the entry possible region is in an entry impossible state; and in response to determining the entry possible region as being in the entry impossible state, changing the entry possible region.

11. The method of claim 9, wherein the sensing comprises:

sensing a form of a driving lane in which the vehicle is driving and a form of at least one adjacent lane adjacent to the driving lane; and based on the sensed form of the driving lane and the sensed form of the at least one adjacent lane, selecting the entry scheduled lane among from the at least one adjacent lane.

12. The method of claim 9, wherein the determining of the entry possible region comprises:

determining the entry possible region based on the driving state of the at least one external vehicle and the driving state of the vehicle.

13. The method of claim 9, wherein the sensing comprises sensing at least one of a position, a speed, an acceleration, the shaking state, or a direction of the at least one external vehicle by using a distance sensor.

14. The method of claim 9, wherein the entry condition comprises at least one of a position of the vehicle on a driving lane for entering from the driving lane to the entry possible region, a time for the vehicle to enter the entry possible region, or an acceleration of the vehicle to enter the entry possible region.

15. The method of claim 9, wherein the outputting comprises displaying and outputting an image that guides an entry into the entry possible region according to the entry condition or outputting a voice that guides the entry into the entry possible region according to the entry condition.

16. The method of claim 9, further comprising controlling a driving device of the vehicle such that the vehicle enters the entry possible region according to the entry condition.

17. A non-transitory computer-readable recording medium comprising program code, which when executed by a processor, causes the processor to perform:
- sensing a driving state of at least one external vehicle on an entry scheduled lane that a vehicle is to enter by changing lanes and a shaking state of the at least one external vehicle;
- based on the shaking state of the at least one external vehicle, determine whether a degree of shaking of the at least one external vehicle is equal to or greater than a predetermined value;
- based on the driving state of the at least one external vehicle and the degree of shaking being less than the predetermined value, determining an entry possible region on the entry scheduled lane;
- determining candidate regions with respect to the entry possible region;
- classifying each of the candidate regions with a priority based on a vehicle interval between external vehicles;
- selecting a highest priority candidate region among the classified candidate regions as the entry possible region;
- determining an entry condition comprising a speed and a direction of the vehicle required to enter the entry possible region; and
- outputting information about the entry possible region and the entry condition.

18. The electronic device of claim 1,
- wherein the driving state comprises a position, a speed, and an acceleration of the at least one external vehicle,
- wherein the shaking state comprises yaw, roll, and pitch of the at least one external vehicle, and
- wherein the processor is further configured to, in response to determining the degree of shaking as being greater than or equal to the predetermined value, determine the entry possible region on the entry scheduled lane to be in an entry impossible state.

* * * * *